United States Patent
Colombo et al.

(10) Patent No.: US 8,671,261 B2
(45) Date of Patent: Mar. 11, 2014

(54) LIGHTWEIGHT RANDOM MEMORY ALLOCATION

(75) Inventors: Gregory J. Colombo, Redmond, WA (US); Hari Pulapaka, Redmond, WA (US); Arun U. Kishan, Bellevue, WA (US); Stephen L. Hufnagel, Snohomish, WA (US); Garrett Trent Leischner, Seattle, WA (US); Evan Lincoln Tice, Seattle, WA (US); Matthew R. Miller, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 284 days.

(21) Appl. No.: 13/086,936

(22) Filed: Apr. 14, 2011

(65) Prior Publication Data

US 2012/0265947 A1    Oct. 18, 2012

(51) Int. Cl.
| G06F 13/00 | (2006.01) |
| G06F 13/28 | (2006.01) |
| G06F 9/26 | (2006.01) |
| G06F 9/34 | (2006.01) |

(52) U.S. Cl.
USPC ............ 711/170; 711/217; 711/219; 711/221

(58) Field of Classification Search
USPC .................................. 711/170, 217, 219, 221
See application file for complete search history.

(56) References Cited

U.S. PATENT DOCUMENTS

| 5,784,699 | A  | * | 7/1998 | McMahon et al. ............ 711/171 |
| 7,546,430 | B1 | * | 6/2009 | Miller et al. .................. 711/163 |
| 7,779,216 | B2 |   | 8/2010 | Souders et al. |
| 2007/0156997 | A1 | * | 7/2007 | Boule et al. .................... 711/170 |
| 2007/0233982 | A1 | * | 10/2007 | Chen et al. ..................... 711/163 |
| 2008/0016314 | A1 |   | 1/2008 | Li et al. |
| 2008/0140737 | A1 | * | 6/2008 | Garst et al. .................... 707/206 |
| 2009/0193212 | A1 | * | 7/2009 | Kodaka ......................... 711/163 |
| 2009/0254726 | A1 |   | 10/2009 | Miller et al. |
| 2010/0115231 | A1 | * | 5/2010 | Yui ............................... 711/221 |

OTHER PUBLICATIONS

Ding, et al., "Heap Taichi: Exploiting memory allocation granularity in heap-spraying attacks", Retrieved at << http://www.acsac.org/2010/openconf/modules/request.php?module=oc_program&action=view.php&a=&id=31&type=2 >>, In the Proceedings of the 26th Annual Computer Security Applications Conference, Dec. 6, 2010, pp. 327-336.

Aggarwal, Gaurav, "Thinking beyond heap randomization", Retrieved at << http://www.stanford.edu/~agaurav/files/heap.pdf >>, Feb. 12, 2009, pp. 1-8.

Gadalete, Francesco, "Address space layout randomization: an overview", Retrieved at << http://www.gadaleta.org/main/wp-content/uploads/2008/09/aslr.pdf >>, Sep. 17, 2008, pp. 1-4.

(Continued)

*Primary Examiner* — Matthew Bradley
*Assistant Examiner* — Ricio Del Mar Perez-Velez
(74) *Attorney, Agent, or Firm* — Tony Azure; Andrew Sanders; Micky Minhas

(57) ABSTRACT

In response to a memory allocation request received from an application thread, a random number is obtained (e.g., from a random number list previously populated with multiple random numbers). A starting location in at least a portion of a bitmap associated with a region including multiple blocks of the memory is determined based on the random number. A portion of the bitmap is scanned, beginning at the starting location, to identify a location in the bitmap corresponding to an available block of the multiple blocks, and an indication of this available block is returned to the application thread.

20 Claims, 6 Drawing Sheets

(56) References Cited

OTHER PUBLICATIONS

Li, et al., "Address-space randomization for windows systems", Retrieved at << http://seclab.cs.sunysb.edu/seclab/pubs/acsac06.pdf >>, In the Proceedings of the 22nd Annual Computer Security Applications Conference, Dec. 2006, 10 pages.

Whitehouse, Ollie, "An analysis of address space layout randomization on windows vista™", Retrieved << at http://www.symantec.com/avcenter/reference/Address_Space_Layout_Randomization.pdf >>, Retrieved Date: Jan. 5, 2011, 19 pages.

Ratanaworabhan, et al., "Nozzle: A Defense Against Heap-spraying Code Injection Attacks", USENIX Security Symposium, Aug. 2009, 18 pages.

* cited by examiner

LIGHTWEIGHT RANDOM MEMORY ALLOCATION

BACKGROUND

Computer operating systems typically include a memory allocator that divides up large areas of memory into smaller blocks and allocates those smaller blocks to programs running on the computer. Although use of a memory allocator tends to result in more efficient utilization of the memory available in the computer, memory allocators are not without their problems. One such problem is that oftentimes the order in which memory allocators allocate blocks of memory to programs is reasonably deterministic, which creates a potential vulnerability that could be leveraged by malware or other malicious programs to attack the computer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects a request is received, from an application thread, for memory to be allocated to the application thread. A random number is obtained, and a starting location in at least a portion of a bitmap associated with a region including multiple blocks of the memory is determined based on the random number. A portion of the bitmap is scanned, beginning at the starting location, to identify a location in the bitmap corresponding to an available block of the multiple blocks, and an indication of this available block is returned to the application thread.

In accordance with one or more aspects, a random number list is populated with multiple random numbers. In response to a memory allocation request from an application thread, an index value associated with the application thread is identified and a random number from the random number list is obtained based on the index value. A portion of a data structure associated with a region including multiple blocks of memory is scanned to identify an available block of the multiple blocks, the scanning beginning at a location determined based on the random number, and an indication of the identified available block is returned to the application thread.

BRIEF DESCRIPTION OF THE DRAWINGS

The same numbers are used throughout the drawings to reference like features.

DETAILED DESCRIPTION

Lightweight random memory allocation is discussed herein. In one or more embodiments, regions of memory include multiple blocks of memory that can be allocated to application threads. Each region has an associated bitmap, and each of the multiple blocks in the region corresponds to one of multiple locations in the bitmap. In response to a request from an application thread for memory to be allocated to the application thread, both a region and a portion of the bitmap associated with that region are identified. A random number is obtained (e.g., from a list of previously generated random numbers) and used to determine a starting location in the identified bitmap. The bitmap is scanned, beginning at the starting location, to identify a location in the bitmap that corresponds to an available block of the multiple blocks, and that available block is returned to the requesting application thread.

Figure 1:
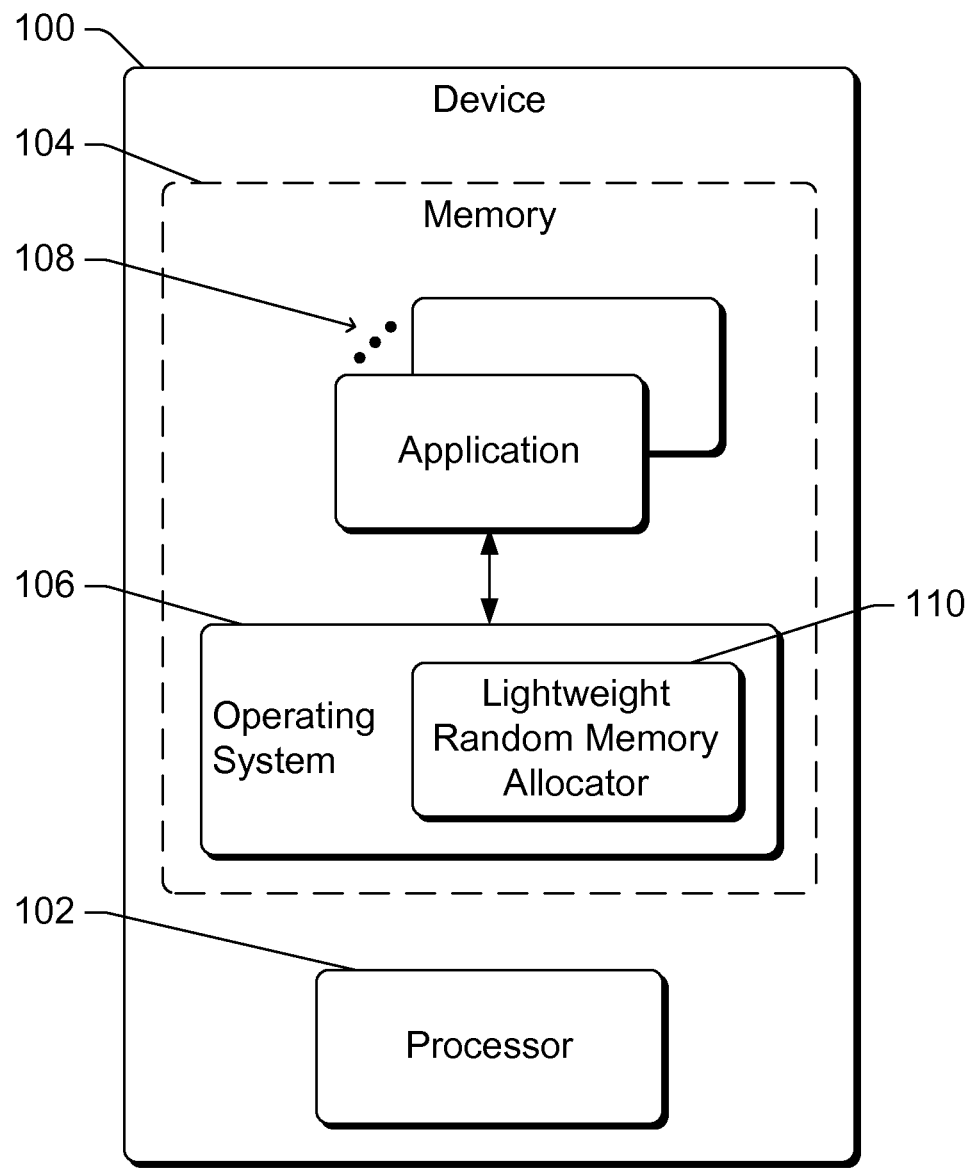
FIG. 1 is a block diagram illustrating an example device implementing the lightweight random memory allocation in accordance with one or more embodiments.

FIG. 1 is a block diagram illustrating an example device 100 implementing the lightweight random memory allocation in accordance with one or more embodiments. Device 100 can be a variety of different types of devices, such as a physical device or a virtual device. For example, device 100 can be a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Device 100 can also be a virtual device, such as a virtual machine running on a physical device. A virtual machine can be run on any of a variety of different types of physical devices (e.g., any of the various types listed above).

Device 100 includes a processor 102 and memory 104. Although a single processor 102 is illustrated in FIG. 1, it should be noted that device 100 can include multiple processors (of the same or different types). Additionally, processor 102 can include any number of cores. An operating system 106 and one or more applications 108 are depicted in memory 104 and are executable by processor 102. Operating system 106 manages the running of applications 108, scheduling applications 108 for execution by processor 102, controlling access to various other components or modules of device 100, and so forth.

Applications 108 are typically run as one or more threads. Each thread of an application implements a particular part or functionality of that application, with different threads typically implementing different parts of the application. Each application 108 can be run as any number of threads, including an application being run as a single thread. The number of threads that an application 108 is run as can vary based on the manner in which application 108 is designed and implemented, and/or based on the implementation of operating system 106.

Operating system 106 also includes a lightweight random memory allocator 110. As threads of applications 108 are run, these threads can desire space within memory 104 for performing various operations. These threads submit requests for the desired space within memory 104 by submitting memory allocation requests to lightweight random memory allocator 110. Lightweight random memory allocator 110 manages the allocation of space within memory 104 to applications 108, receiving memory allocation requests from application threads, identifying available spaces within memory 104, and returning identifiers of (e.g., addresses of) the identified spaces within memory 104 to the requesting application threads as the allocated memory space. The space within memory 104 that lightweight random memory allocator 110 manages, and can allocate to applications 108, can be obtained from another component or module of operating system 106 (e.g., a kernel of operating system 106), or alternatively can be determined by lightweight random memory allocator 110 itself. Obtaining memory for allocation from another component or module of operating system 106 can involve significant overhead and time. Accordingly, lightweight random memory allocator 110 can reduce the time taken for application threads to be allocated memory by obtaining a region of memory from operating system 106 and allocating blocks of that region to application threads.

Lightweight random memory allocator 110 is referred to as being random because allocator 110 introduces an amount of randomness into the identification of the space within memory 104 to return in response to a request from an application thread. Additionally, lightweight random memory allocator 110 is referred to as being lightweight because allocator 110 does not significantly impact (e.g., does not significantly increase) the time taken to respond to requests for space within memory 104, as discussed in more detail below.

Figure 2:
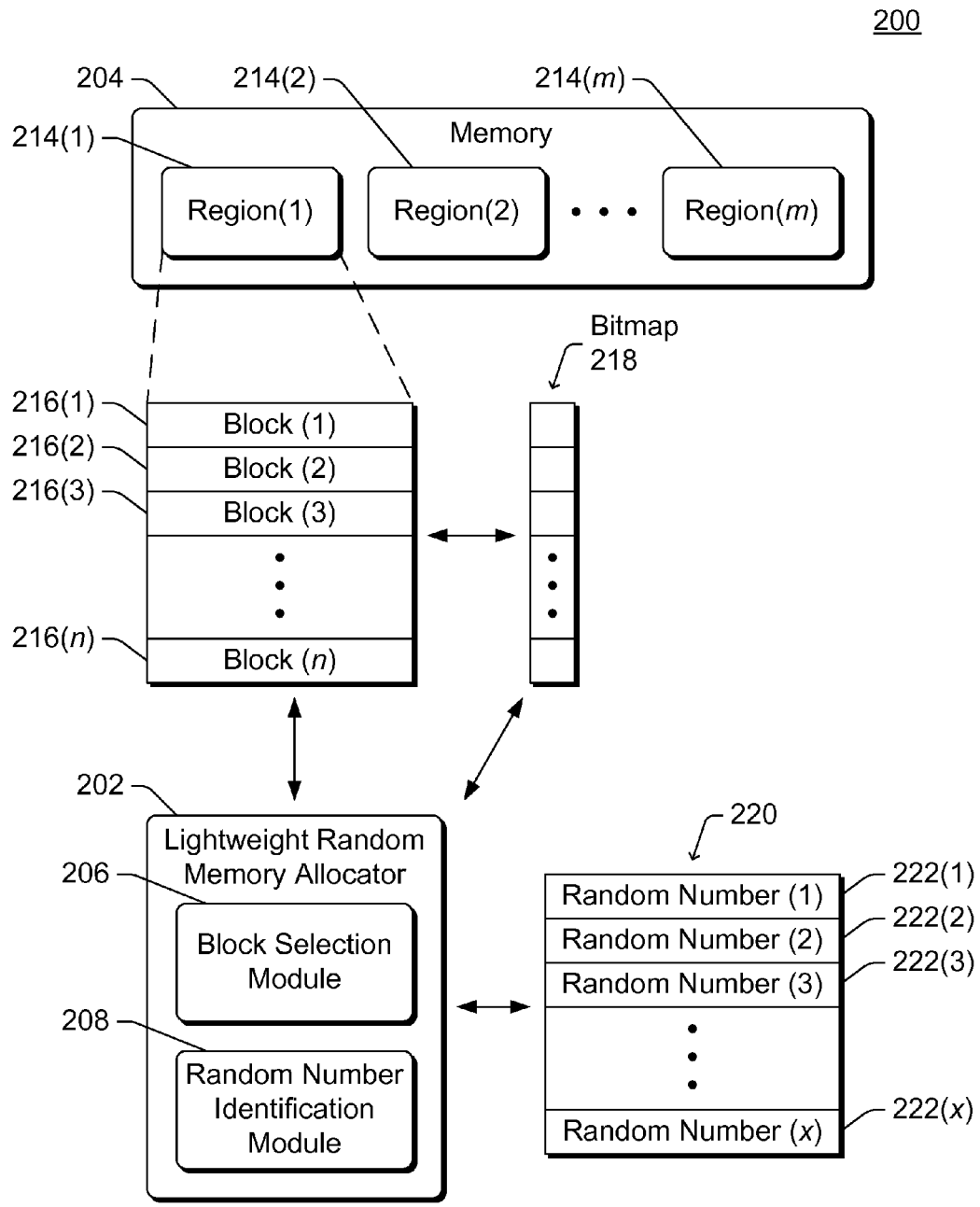
FIG. 2 is a block diagram illustrating an example system implementing the lightweight random memory allocation in accordance with one or more embodiments.

FIG. 2 is a block diagram illustrating an example system 200 implementing the lightweight random memory allocation in accordance with one or more embodiments. System 200 can be implemented, for example, as a device 100 of FIG. 1. System 200 includes a lightweight random memory allocator 202 and memory 204. Lightweight random memory allocator 202 can be lightweight random memory allocator 110 of FIG. 1. Memory 204 can be a portion of memory 104 of FIG. 1 (e.g., a portion that can be allocated to application threads by allocator 110).

Random numbers and their usage are discussed herein. Random numbers are generated by a random number generator, and any of a variety of conventional random number generators (or alternatively other proprietary random number generators) can be used to generate the random numbers discussed herein. A random number generator can be implemented in hardware, software, firmware, or combinations thereof. Additionally, in one or more embodiments a random number generator is a deterministic system designed to imitate or approximate a true random generator. Accordingly, such a random number generator can also be referred to as a pseudo-random number generator, and the random numbers used herein can be pseudo-random or quasi-random numbers. Thus, the random numbers discussed herein can be truly random numbers, or alternatively pseudo-random or quasi-random numbers, or combinations thereof.

Lightweight random memory allocator 202 includes a block selection module 206 and a random number identification module 208. Block selection module 206 manages selection of a block of a region of memory 204 to return to an application thread in response to a request for memory 204 (also referred to as a memory allocation request or a request that memory be allocated to the application thread). Random number identification module 208 manages obtaining random numbers for use by block selection module 206, and optionally maintaining a random number list.

Memory 204 is typically random access memory (RAM), but can alternatively include other types of memory (e.g., Flash memory). Memory 204 is organized into multiple (m) regions 214 (illustrated as regions 214(1), . . . 214(m)). The number of regions 214 in memory 204, and the number of bytes of memory included in each region 214, can vary based on implementation for different operating systems, devices on which system 200 is implemented, and so forth.

Each region includes multiple different blocks. In the illustrated example, region 214(1) is expanded to show multiple (n) blocks 216 (illustrated as blocks 216(1), . . . 216(n)). Different regions can have the same number of blocks, or alternatively different regions can have different numbers of blocks. A block can have any number of bytes, and the number of bytes in a block can vary based on implementation for different operating systems, devices on which system 200 is implemented, and so forth. For example, the number of bytes in a block can be 32 bytes, 64 bytes, and so forth. Different blocks can have the same number of bytes, or alternatively different blocks can have different numbers of bytes.

Each region 214 has an associated data structure that identifies which blocks within that region 214 are available and which blocks within that region 214 are not available. This data structure is discussed herein as being a bitmap, an example of which is illustrated as bitmap 218, although other data structures (e.g., linked lists, binary trees, etc.) can alternatively be used. A block being available refers to the block not currently being allocated to an application thread and not otherwise being used, and thus can be allocated to an application thread in response to a memory allocation request. An available block can also be referred to as a free block. A block being unavailable refers to the block being currently allocated to an application thread or otherwise being used so that the block cannot be allocated to an application thread in response to a memory allocation request. An unavailable block can also be referred to as an in-use block.

Bitmap 218 corresponds to a particular region 214, and each region 214 has a different corresponding bitmap. Bitmap 218 includes multiple locations, each block of region 214 corresponding to a particular location in bitmap 218. Each location has a bit indicating whether the corresponding block is available or unavailable. In one or more embodiments the bit at a location is cleared (e.g., the bit has a value of 0) to indicate that the corresponding block is available, and the bit at the location is set (e.g., the bit has a value of 1) to indicate that the corresponding block is unavailable. Alternatively, other values can be used to indicate whether the corresponding block is available or unavailable.

The correspondence between locations of bitmap 218 and blocks 216 can be maintained in a variety of different manners. In one or more embodiments, the ordering of blocks 216 in region 214 is the same as the ordering of locations in bitmap 218, so the first location of bitmap 218 corresponds to block 216(1), the second location of bitmap 218 corresponds to block 216(2), the third location of bitmap 218 corresponds to block 216(3), and so forth.

Additionally, in one or more embodiments bitmap 218 is organized as multiple portions, although alternatively bitmap 218 can be a single portion. Different portions can have the same number of bits, or alternatively different portions can have different numbers of bits. A portion can have any number of bits, and the number of bits in a portion can vary based on implementation for different operating systems, devices on which system 200 is implemented, and so forth. System 200 is typically implemented on a device (e.g., physical or virtual as discussed above) having a particular native word size. The native word size refers to, for example, the size or width (e.g., in number of bits) of registers (e.g., hardware or virtual) of the device. The number of bits in a portion of the bitmap can be this native word size. For example, if system 200 were implemented on a 32-bit device (a device with a native word size of 32 bits) then the portions of bitmap 218 are 32 bits, and if system 200 were implemented on a 64-bit device (a device with a native word size of 64 bits) then the portions of bitmap 218 are 64 bits. Having the number of bits in a portion of the bitmap be no greater than the native word size of the device on which system 200 is implemented allows instructions supported by the device and designed for the native word size to be leveraged by lightweight random memory allocator 202.

Application threads can request that part of memory 204 be allocated to them for various usage. A requesting application thread can use the memory allocated to it to store data, instructions, and so forth. An application thread submits a memory allocation request to lightweight random memory allocator 202, which selects an available block of memory 204 and returns an indication of that selected block to the application thread. Blocks of memory can be requested on a block by block basis, or alternatively multiple blocks of memory can be requested concurrently.

Application threads also typically, in addition to requesting that memory be allocated, can release memory that they were previously allocated. Application threads can release memory for various reasons, such as if the data being stored in that memory is no longer being used by the application thread. To release or free memory, an application thread sends a request to de-allocate or otherwise free one or more blocks of memory, identifying those one or more blocks as part of the request. In response to such a request, lightweight random memory allocator 202 updates the locations of the bitmaps corresponding to those one or more blocks to indicate that the de-allocated blocks of memory are now available. Additionally, in one or more embodiments lightweight random memory allocator 202 maintains a record of the most recently de-allocated or freed block of memory 204 for each region 214. Lightweight random memory allocator 202 can also maintain a record of the most recently de-allocated or freed block of memory 204 across all regions 214.

Lightweight random memory allocator 202 receives a memory allocation request from an application thread. Generally, in response to the memory allocation request, block selection module 206 selects a block of a region 214 in memory 204 that is available and returns an indication of the selected block to the requesting application thread.

More specifically, in response to a memory allocation request block selection module 206 selects one of regions 214. The particular region 214 can be selected in a variety of different conventional (or alternatively other proprietary) manners. The particular region 214 can be, for example, the region 214 including the most recently de-allocated or freed block of memory 204 across all regions 214, or the region 214 including the most recently allocated block across all regions 214. Alternatively, a variety of other rules or criteria can be used to select a particular region 214. For purposes of the following discussion it is assumed that region 214(1) is selected.

For the selected region, block selection module 206 selects a portion of the bitmap corresponding to the selected region, which is bitmap 218 corresponding to region 214(1) in the illustrated example. The particular portion of bitmap 218 that is selected can be determined in different manners using various rules or criteria.

In one or more embodiments, the portion of bitmap 218 that is selected by block selection module 206 is the portion that includes a location that corresponds to the most recently freed block 216 of region 214(1). If there is no most recently freed block 216 of region 214(1), or no available indication of a most recently freed block 216 of region 214(1), then a portion is selected using other rules or criteria (e.g., a portion at the beginning or ending of bitmap 218 is selected, a portion is selected randomly, etc.). Additionally, block selection module 206 selects a portion of bitmap 218 including at least one location indicating that a corresponding block 216 is available. If no location in the portion indicates that a corresponding block 216 is available, then a portion is selected using other rules or criteria (e.g., an adjacent portion of bitmap 218 is selected, another portion is selected randomly, etc.). Thus, for example, if the portion of bitmap 218 that includes a location that corresponds to the most recently freed block 216 of region 214(1) does not include at least one location indicating that a corresponding block 216 is available, then another portion is selected. If no locations in bitmap 218 indicate that a corresponding block 216 is available, then another region 214 is selected.

Whether a portion includes at least one location indicating that a corresponding block 216 is available can be determined in different manners. For example, if each location of bitmap 218 has a value of 0 to indicate that the corresponding block is available and has a value of 1 to indicate that the corresponding block is unavailable, then a check can be made (e.g., calling a single instruction if supported by a processor of the device implementing system 200) as to whether all the locations of a portion have a value of 1. If all the locations of a portion have a value of 1, then block selection module 206 readily knows that the portion does not include at least one location indicating that a corresponding block 216 is available. By way of another example, if each portion of bitmap 218 is 32 bits, and if each location of bitmap 218 has a value of 0 to indicate that the corresponding block is available and has a value of 1 to indicate that the corresponding block is unavailable, then a quick check can be made (e.g., calling a single instruction if supported by a processor of the device implementing system 200) as to whether the 32-bit portion, when viewed as a single 32-bit number, equals 4,294,967,295. If all 32 bits have a value 1 then the 32-bit portion will equal 4,294,967,295, otherwise the 32-bit portion will equal some other value. Thus, if the 32-bit portion when viewed as a single 32-bit number equals 4,294,967,295 then block selection module 206 readily knows that the portion does not include at least one location indicating that a corresponding block 216 is available.

Additionally, random number identification module 208 obtains random numbers for use by block selection module 206 in determining a starting location of the selected portion of bitmap 218 to begin scanning for a location indicating a corresponding available block 216. In one or more embodiments, random number identification module 208 maintains a random number list 220 that has multiple (x) random numbers 222 (illustrated as random numbers 222(1), . . . 222(x)). Random numbers 222 are also referred to as previously generated random numbers because they are typically generated prior to the memory allocation request being received rather than being generated in response to the memory allocation request. Random number list 220 can have any amount of random numbers, and the amount of random numbers in random number list 220 can vary based on implementation for different operating systems, devices on which system 200 is implemented, and so forth. Similarly, random numbers 222 can include any range of values, and the range of values for random numbers 222 can vary based on implementation for different operating systems, devices on which system 200 is implemented, and so forth. In one or more embodiments, random number list 220 includes 256 random numbers each ranging from 0 to 127 inclusive, although other amounts of random numbers and/or ranges for random numbers can alternatively be used.

In one or more embodiments, each application thread has associated metadata that includes an index value used by random number identification module 208. The application thread itself can store and provide this index value to lightweight random memory allocator 202, or alternatively lightweight random memory allocator 202 can store this index value or another component or module can store and provide this index value to lightweight random memory allocator 202. The index value can be initialized to different values (e.g., when the application thread begins execution), such as 0, a random number, and so forth. The index value identifies a location in random number list 220. For example, if random number list 220 includes 256 random numbers, then the index value can range from 0 to 255 inclusive.

Random number identification module 208 obtains the index value for the application thread (as provided to lightweight random memory allocator 202) and obtains the random number 222 at a location in random number list 220 based on the index value for the application thread. For example, the random number at the location in random number list 220 identified by the index value can be obtained, or a new value can be calculated (using a variety of different formulas or functions) using the index value and the random number at the location in random number list 220 identified by the new value can be obtained.

Random number identification module 208 returns the obtained random number 222 to block selection module 206. By obtaining random numbers from random number list 220, random number identification module 208 can quickly obtain a random number and does not require a significant amount of time to generate a random number for each memory allocation request. Thus, the obtaining of the random number during the process of selecting a block of memory in response to a memory allocation request does not significantly increase the time taken to respond to the memory allocation request (relative to the time taken if no such random number were to be obtained).

The index value is also updated, such as by random number identification module 208 or block selection module 206, to identify a next random number in random number list 220. Thus, the next time a memory allocation request is received from the application thread, a different random number 222 is obtained by random number identification module 208. The index value can be updated in different manners, such as by incrementing the index value by 1 or another value (and wrapping around to 0 if already at the last number in random number list 220 (e.g., if random number list 220 includes 256 values and the index value is 255 before being incremented)), by decrementing the index value by 1 or another value (and wrapping around to the last number in random number list 220 if at the beginning of random number list 220 (e.g., if random number list 220 includes 256 values and the index value is 0 before being decremented, then wrapping around to 255)). Alternatively, the index value can be updated prior to random number identification module 208 obtaining the random number.

Alternatively, rather than maintaining a different index value for each application thread, a single index value can be maintained for groups of multiple threads (e.g., a single index value for all application threads, or a single index value for each of other groupings of application threads). This single index value would be used by random number identification module 208, and updated, for each memory allocation request from an application thread in the group.

In other embodiments, random number identification module 208 can obtain random numbers for use by block selection module 206 in other manners. For example, random number identification module 208 can invoke, or implement, a random number generator. By way of another example, random number identification module 208 can obtain a random number from another module or component of system 200.

Block selection module 206 uses the random number obtained by random number identification module 208 in determining a starting location of the selected portion of bitmap 218 at which to begin scanning for a location indicating a corresponding available block 216. In one or more embodiments, block selection module 206 uses the random number by rotating the portion of bitmap 218 the random number of times. This rotation can be performed in different manners, such as by calling a single rotate instruction (a single machine instruction) supported by a processor of the device implementing system 200. The bits of the portion are rotated from left to right (or alternatively right to left), with bits at the ending of the portion being rotated around to the beginning of the portion (or bits at the beginning of the portion being rotated around to the ending of the portion). Alternatively, another value can be calculated based on the random number using a variety of different formulas or functions, and the portion of bitmap 218 rotated by the calculated value rather than the random number.

By rotating the portion of the bitmap, block selection module 206 generates a rotated portion of the bitmap and determines the staring location of the selected portion of the bitmap to be the rightmost bit (or alternatively leftmost bit) of the rotated portion of the bitmap. Thus, after rotating the portion of the bitmap, block selection module 206 begins scanning the rotated portion from the rightmost bit (or alternatively leftmost bit) of the rotated portion for a location of the rotated portion that corresponds to an available block of memory. For example, if a value of 0 at a location indicates a block corresponding to the location is available, then block selection module 206 begins scanning the rotated portion for a value of 0. This scanning can be performed in different manners, such as by calling a single scan instruction (a single machine instruction) supported by a processor of the device implementing system 200.

The scanning identifies a location of the rotated portion that indicates that a block corresponding to the location is available. For example, the scanning identifies the next location (which may be the starting location of the scanning) having a value of 0. Block selection module 206 identifies the block 216 corresponding to that location identified by the scanning, and returns an indication of the identified block to the application thread in response to the memory allocation request. The block 216 corresponding to that location identified by the scanning is thus the block 216 selected by block selection module 206 for allocation to the application thread in response to the memory allocation request. Block selection module 206 also updates a value at that location identified by the scanning to indicate that the corresponding block is now unavailable. Block selection module 206 knows the correspondence between bitmap 218 and blocks 216, as well as the amount that the selected portion of bitmap 218 was rotated, and thus can readily determine the block 216 corresponding to the location in the portion of bitmap 218 identified by the scanning For example, if the portion of the bitmap 218 is rotated the random number of times from right to left, then block selection module 206 can readily determine that the original position of that location within the portion was by adding, to the location at which the scanning stopped, the random number modulo the number of bits in the portion.

By using such rotation and scanning, block selection module 206 can quickly identify a location in bitmap 218 corresponding to an available block 216 and does not require a significant amount of time to identify the location for each memory allocation request. Thus, the use of the random number during the process of selecting a block of memory in response to a memory allocation request does not significantly increase the time taken to respond to the memory allocation request (relative to the time taken if no such random number were to be used).

Figure 3:
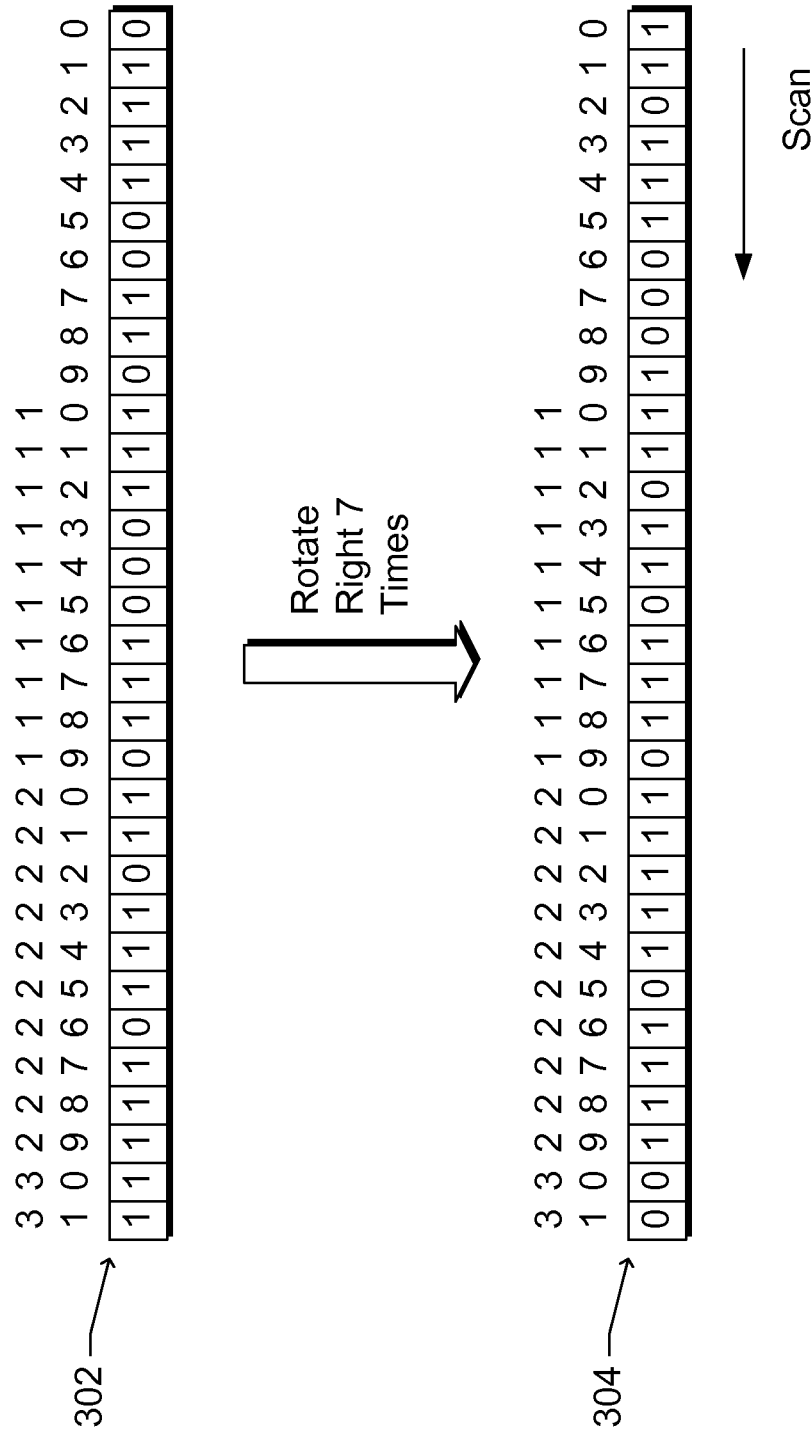
FIG. 3 illustrates an example of the rotation and scanning of a portion of a bitmap in accordance with one or more embodiments.

FIG. 3 illustrates an example of the rotation and scanning of a portion of a bitmap in accordance with one or more embodiments. In the example of FIG. 3, the portion of the bitmap is rotated right to left and the starting location for scanning is the rightmost bit of the portion after rotation, although the rotation can be performed in other manners and/or the starting location can be determined in other manners as discussed above.

A 32-bit portion 302 of a bitmap is shown, and location or bit numbers are indicated above portion 302. The location or bit numbers are 0-31, from right to left. Accordingly, bit 0 has a value of 0, bit 1 has a value of 1, bit 2 has a value of 1, bit 19 has a value of 0, bit 27 has a value of 1, and so forth. In FIG. 3, assume that portion 302 is rotated to the right seven times. Each time portion 302 is rotated, or each rotation of portion 302, the value in each bit location is shifted to the right one location with the value in bit 0 being wrapped around to bit 31. Rotated portion 304 is a rotated portion of the bitmap generated by rotating portion 302 to the right seven times.

The starting location for scanning of rotated portion 304 is the rightmost bit (bit 0), and proceeds from right to left. Assuming a value of 1 indicates the corresponding block is unavailable and a value of 0 indicates the corresponding block is available, the scanning stops when the first bit having a value of 0 is encountered. The first bit of rotated portion 304 having a value of 0 is bit 2. To identify the block corresponding to bit 2 of rotated portion 304, 7 (the random number) modulo 32 (the number of bits in the portion), which is 7, is added to 2 (the location identified by the scanning), resulting in a sum of 9. Accordingly, the block corresponding to bit 9 in portion 302 is the selected available block, and an indication of the block corresponding to bit 9 in portion 302 is returned to the application thread in response to the memory allocation request.

Returning to FIG. 2, block selection module 206 can alternatively use the random number to determine a starting location of the selected portion of bitmap 218 in other manners. For example, block selection module 206 can use the random number (or another value generated based on the random number) as an index into the portion of bitmap 218 without rotating the portion of bitmap 218. Block selection module 206 can then begin scanning at the location identified by the index into the portion.

Furthermore, the scanning of block selection module 206 can alternatively identify a location other than a next location of the rotated portion that indicates that a block corresponding to the location is available. For example, the scanning of block selection module 206 can identify a second, third, etc. location (beginning at the starting location) of the rotated portion that indicates that a block corresponding to the location is available.

An indication of the selected block is returned by module 206 to the application thread in response to the memory allocation request as discussed above. In one or more embodiments, the indication of the selected block is a memory address of the beginning of the selected block. Alternatively, the indication of the selected block can take different forms, such as a particular block and region identifier (e.g., the $5^{th}$ block of the $17^{th}$ region), a range of memory addresses, and so forth.

As discussed above, bitmap 218 can be organized as multiple portions. Situations can arise where one or more portions include locations that do not correspond to a block 216. A location that corresponds to a block 216 can be referred to as a valid location, and a location that does not correspond to a block 216 can also be referred to as an invalid location. For example, if bitmap 218 includes 128 bits (four 32-bit portions), but region 214(1) includes only 120 blocks 216, then one of the four portions includes 24 locations that correspond to blocks 216 (e.g., 24 valid locations) and eight locations that do not correspond to blocks 216 (e.g., eight invalid locations).

In such situations, the rotation of a portion that includes one or more invalid locations is performed in a different manner in order to avoid skewing the results of the rotation towards starting scanning at an invalid location. In one or more embodiments, in such situations the rotation is performed in accordance with the following calculation:

$$\text{rotation} = \frac{\text{valid} \times \text{random}}{\text{quantity}}$$

in which "rotation" is the amount by which block selection module 206 will rotate the portion of bitmap 218, "valid" is the number of valid locations in the portion, "random" is the random number obtained by random number identification module 208, and "quantity" is the number of possible different random number values that the random number obtained by random number identification module 208 could be (e.g., 128 if the random numbers range from 0 to 127 inclusive). The integer portion of the value "rotation" can be used, or the value "rotation" can be rounded to an integer, if the value "rotation" is not an integer. After rotating the portion by this "rotation" amount, scanning the rotated portion for a location of the portion that corresponds to an available block of memory proceeds as discussed above. Alternatively, the rotation of a portion that includes one or more invalid locations can be performed in other manners, such as using the same techniques as discussed above (e.g., as if the portion included no invalid locations), using other techniques to map the obtained random number to the number of valid locations in the portion, and so forth.

As discussed above, a memory allocation request in some situations can include a request for multiple blocks of memory 204. In response to a request for multiple blocks of memory, for each requested block random number identification module 208 obtains a random number and block selection module 206 repeats the determination of the starting location and the scanning as discussed above, returning an indication of a block as part of each scanning process. Alternatively, block selection module 206 can identify additional blocks in different manners, such as by continuing scanning and returning an indication of each identified block until the requested number of blocks have been returned (or no more available blocks are associated with portion, at which point a new portion and/or region can be selected and the determination of the starting location and the scanning as discussed above repeated). By way of another example, block selection module 206 can identify additional blocks by repeating the determination of the starting location and the scanning as discussed above multiple times based on the same random number (e.g., after an indication of a block is returned to the application thread, rotating the portion the random number amount of times and then resuming scanning).

As discussed above, in one or more embodiments random number identification module 208 maintains random number list 220. Random number identification module 208 also determines when to populate random number list 220 with new random numbers, adding one or more new random numbers to random number list 220 and/or replacing one or more random numbers in random number list 220 with new random numbers. Random number identification module 208 can determine when to populate random number list 220 with new random numbers based on a variety of different rules or criteria. Random number identification module 208 can generate new random numbers itself, or alternatively can invoke another module or component of system 200 to generate a new random number.

In one or more embodiments, random number identification module 208 initially populates random number list 220 with new random numbers at the time when lightweight random memory allocator 202 (or alternatively random number identification module 208) is initialized or otherwise begins running in system 200, or a threshold amount of time after lightweight random memory allocator 202 (or alternatively random number identification module 208) is initialized or otherwise begins running in system 200.

Additionally, in one or more embodiments random number identification module 208 also determines to populate random number list 220 with new random numbers in response to a high latency operation being performed by lightweight random memory allocator 202. A high latency operation refers to an operation being performed that is expected to take at least a threshold amount of time to perform. The threshold amount of time can be, for example, the amount of time taken to generate one or more random numbers. By populating random number list 220 with one or more new random numbers during performance of a high latency operation, the time taken to populate list 220 with the one or more new random numbers does not significantly impact the time taken by lightweight random memory allocator 202 to respond to memory allocation requests due to its being done concurrently with the performance of the high latency operation.

For example, lightweight random memory allocator 202 obtaining additional regions 214 of memory 204 (e.g., from a kernel of an operating system implementing running on a device implementing system 200) can be a high latency operation. The amount of random numbers in random number list 220 that are replaced with new random numbers can vary. For example, a fixed amount (e.g., 1 or 5) of random numbers can be replaced, or a variable amount (e.g., based on the amount of time that the operation is expected to take) of random numbers can be replaced. Random number identification module 208 can determine which random numbers in random number list 220 to replace in a variety of manners, such as starting at the beginning of list 220 and stepping through list 220, replacing random numbers one by one with new random numbers as the new random numbers are generated. By way of another example, random number identification module 208 can determine which random numbers in random number list 220 to replace by replacing random numbers based on index values of application threads (e.g., stepping backward or forward through list 220 beginning with the location identified by an index value of an application thread), and so forth.

Figure 4:
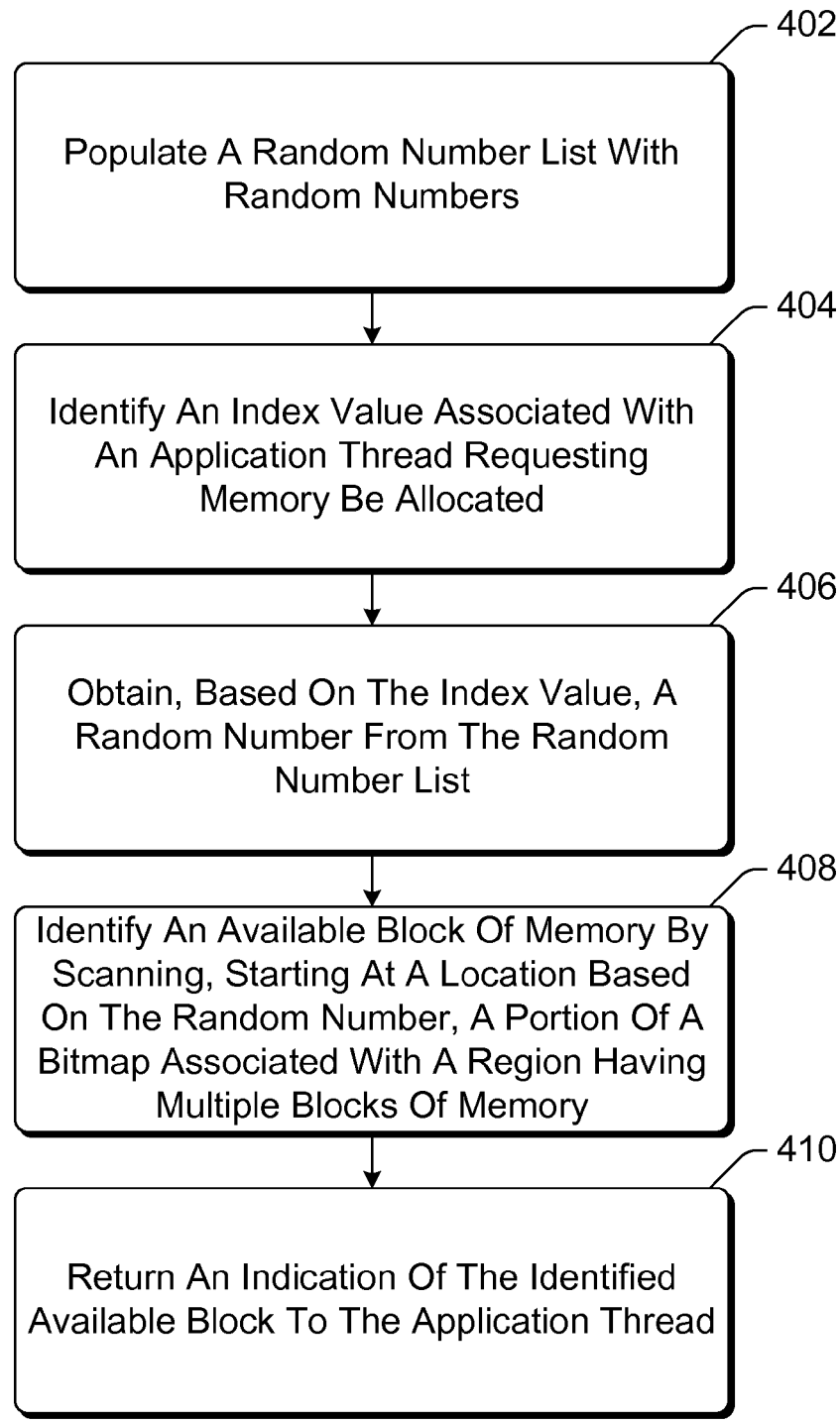
FIG. 4 is a flowchart illustrating an example process for implementing the lightweight random memory allocation in accordance with one or more embodiments.

FIG. 4 is a flowchart illustrating an example process 400 for implementing the lightweight random memory allocation in accordance with one or more embodiments. Process 400 is carried out by a lightweight random memory allocator, such as lightweight random memory allocator 110 of FIG. 1 or lightweight random memory allocator 202 of FIG. 2, and can be implemented in software, firmware, hardware, or combinations thereof. Process 400 is shown as a set of acts and is not limited to the order shown for performing the operations of the various acts. Process 400 is an example process for implementing the lightweight random memory allocation; additional discussions of implementing the lightweight random memory allocation are included herein with reference to different figures.

In process 400, a random number list is populated with random numbers (act 402). The random numbers can be generated or obtained from different components or modules as discussed above.

An index value associated with an application thread requesting that memory be allocated is also identified (act 404). The index value can be provided by the application thread or another component or module as discussed above.

A random value is obtained, based on the index value associated with the application thread, from the random number list (act 406). The random value can be obtained in different manners, such as obtaining the random value at a location in the random number list identified by the index value, as discussed above.

An available block of memory is identified by scanning, starting at a location based on the random number, a portion of a bitmap associated with a region having multiple blocks of memory (act 408). The starting location can be determined and the scanning performed in different manners, such as by rotating the portion of the bitmap and scanning beginning at a rightmost (or leftmost) bit of the rotated portion, as discussed above.

An indication of the identified available block is returned to the application thread (act 410). This indication can take various forms, such as a memory address of the beginning of the identified available block, as discussed above.

Figure 5:
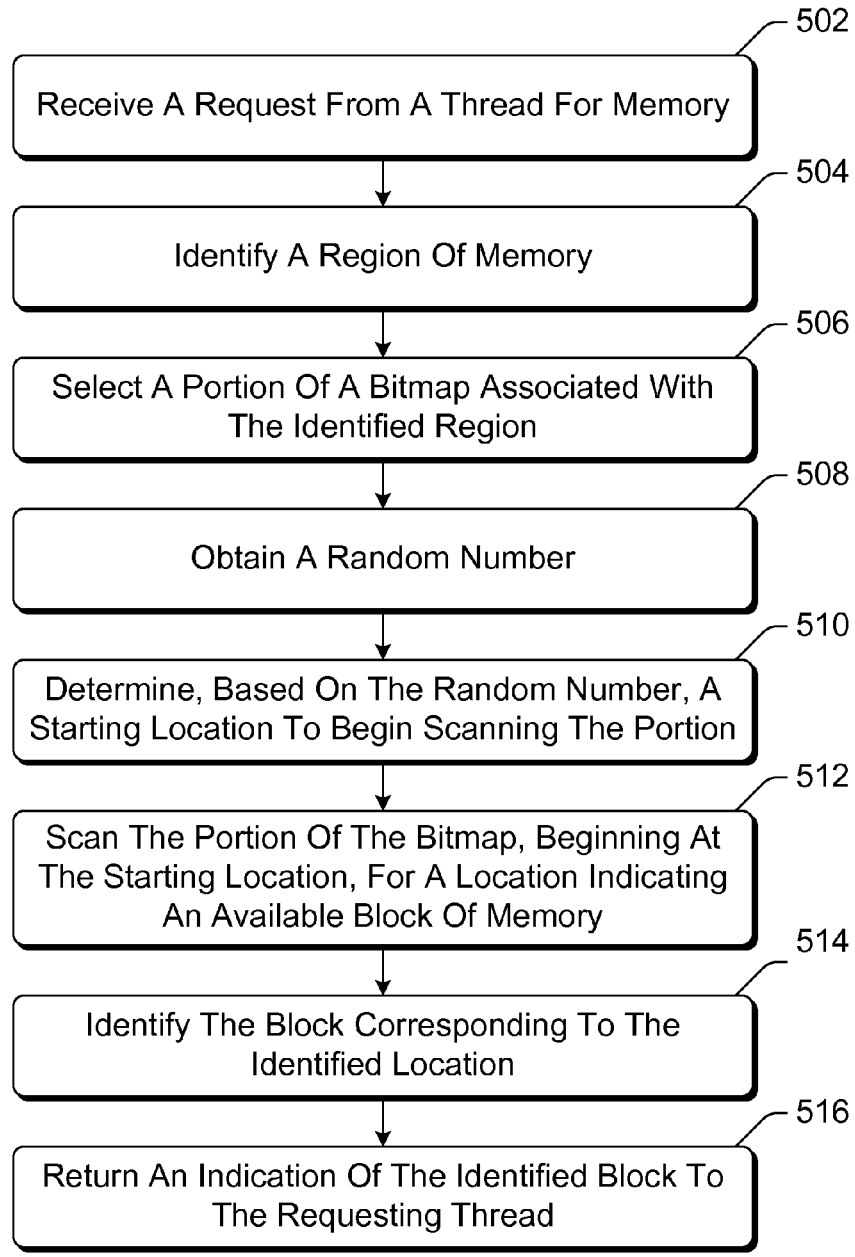
FIG. 5 is a flowchart illustrating an example process for implementing the lightweight random memory allocation in accordance with one or more embodiments.

FIG. 5 is a flowchart illustrating an example process 500 for implementing the lightweight random memory allocation in accordance with one or more embodiments. Process 500 is carried out by a lightweight random memory allocator, such as lightweight random memory allocator 110 of FIG. 1 or lightweight random memory allocator 202 of FIG. 2, and can be implemented in software, firmware, hardware, or combinations thereof. Process 500 is shown as a set of acts and is not limited to the order shown for performing the operations of the various acts. Process 500 is an example process for implementing the lightweight random memory allocation; additional discussions of implementing the lightweight random memory allocation are included herein with reference to different figures.

In process 500, a request for memory is received from a thread of an application (act 502), and a region of memory is identified (act 504). This region can be identified in a variety of different manners as discussed above.

A portion of a bitmap associated with the identified region is selected (act 506). This portion can be selected in different manners, such as based on a most recently freed block of memory in the region and based on whether the portion includes locations corresponding to any available blocks of memory, as discussed above.

Additionally, a random number is obtained (act 508). The random number can be obtained in different manners, such as from a list of previously generated random numbers, as discussed above.

A starting location is determined, based on the random number, to begin scanning the portion of the bitmap (act 510). This starting location can be determined in different manners, such as by rotating the portion a number of times based on the random number, as discussed above.

The portion of the bitmap is scanned, beginning at the starting location, for a location indicating an available block of memory (act 512). Locations can indicate an available block of memory in different manners, such as by being cleared, as discussed above.

The block of memory corresponding to the identified location is identified (act 514). The block can be determined in different manners, based on the manner in which the portion was rotated or the starting location for scanning otherwise determined, as discussed above.

An indication of the identified block is returned to the requesting thread (act 516). This indication can take various forms, such as a memory address of the beginning of the identified block.

Thus, the lightweight random memory allocation techniques discussed herein introduce an amount of randomness into the allocation of memory in a manner that does not significantly impact the time taken to respond to memory allocation requests. Rather than using a free list that chains through available blocks of memory, data structures such as bitmaps can be used to maintain a record of which blocks of memory are available. These bitmaps can be organized into multiple portions that are no greater than the native word size of the device on which the memory allocation is implemented, allowing register-width machine instructions to be leveraged so that a block of memory to be returned in response to the memory allocation request can be quickly selected. Although the region of memory from which a block is selected in response to a memory allocation request can be based on the region to which a block of memory was most recently freed as discussed above, randomness is still introduced into the selection of a block within that region (the most recently freed block of memory is not automatically returned in response to the memory allocation request).

Furthermore, the randomness introduced into the allocation of memory avoids deterministic aspects of memory allocation that may be present in systems employing a free list that chains through available blocks of memory. Various techniques as discussed above can be used so that introducing this randomness does not significantly impact the time taken to respond to memory allocation requests. For example, to obtain a random number in response to a memory allocation request, a random number list can be used rather than a random number generation algorithm, thereby reducing the need for atomic operations and/or significant amounts of time typically associated with random number generation algorithms. By way of another example, the random number list can be populated with new random numbers during performance of high latency operations so that the generation of random numbers does not add significantly to the time taken to respond to a memory allocation request. By way of further example, the index value into the random number list for different application threads can be maintained by the application threads themselves, thereby alleviating any need for (and time taken for) maintaining a global index value state.

Figure 6:
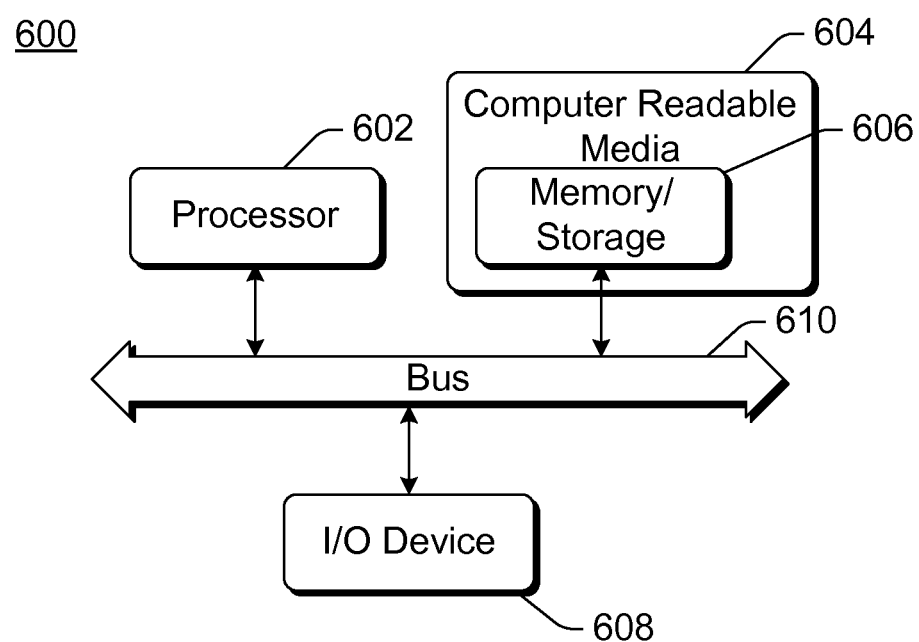
FIG. 6 illustrates an example computing device that can be configured to implement the lightweight random memory allocation in accordance with one or more embodiments.

FIG. 6 illustrates an example computing device 600 that can be configured to implement the lightweight random memory allocation in accordance with one or more embodiments. Computing device 600 can be, for example, device 100 of FIG. 1, or can implement device 100 of FIG. 1 and/or system 200 of FIG. 2.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or nonvolatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 6. The features of the lightweight random memory allocation techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a system, the method comprising:
receiving, from an application thread, a request for memory to be allocated to the application thread, including an index value;
selecting a portion of a bitmap associated with a region including multiple blocks of the memory, the portion of the bitmap including a number of bits equal to a native word size of a device implementing the system, the portion including a location corresponding to a most recently freed block of the multiple blocks;
obtaining a random number from a list of previously generated random numbers, the obtaining based on the received index value;
determining, by rotating the portion of the bitmap a number of times based on the random number to generate a rotated portion of the bitmap, a starting location in the rotated portion of the bitmap;
scanning, beginning at the starting location, the rotated portion of the bitmap to identify a location in the rotated portion corresponding to an available block of the multiple blocks;
identifying the available block based on the identified location in the rotated portion; and
returning, to the application thread, an indication of the available block.

2. The method of claim 1, wherein said indication comprises a memory address of a beginning of the available block.

3. The method of claim 1, wherein the index value can be initialized to different values.

4. The method of claim 1, wherein said obtaining is performed by obtaining the random number from a random number list at a location identified by the index value.

5. The method of claim 1, wherein said obtaining is performed by obtaining the random number from a random number list at a location identified by a value calculated from the index value.

6. The method of claim 1 further comprising updating the index value effective to enable identification of a next random number for a next memory allocation request.

7. The method of claim 1 further comprising maintaining a single index value for groups of multiple threads.

8. One or more computer-readable storage memories storing computer-readable instructions which, when executed, implement a method comprising:
receiving, from an application thread, a request for memory to be allocated to the application thread, including an index value;
selecting a portion of a bitmap associated with a region including multiple blocks of the memory, the portion of the bitmap including a number of bits equal to a native word size of a device implementing the system, the portion including a location corresponding to a most recently freed block of the multiple blocks;
obtaining a random number from a list of previously generated random numbers, the obtaining based on the received index value;
determining, by rotating the portion of the bitmap a number of times based on the random number to generate a rotated portion of the bitmap, a starting location in the rotated portion of the bitmap;
scanning, beginning at the starting location, the rotated portion of the bitmap to identify a location in the rotated portion corresponding to an available block of the multiple blocks;
identifying the available block based on the identified location in the rotated portion; and
returning, to the application thread, an indication of the available block.

9. The one or more computer-readable storage memories of claim 8, wherein said indication comprises a memory address of a beginning of the available block.

10. The one or more computer-readable storage memories of claim 8, wherein the index value can be initialized to different values.

11. The one or more computer-readable storage memories of claim 8, wherein said obtaining is performed by obtaining the random number from a random number list at a location identified by the index value.

12. The one or more computer-readable storage memories of claim 8, wherein said obtaining is performed by obtaining the random number from a random number list at a location identified by a value calculated from the index value.

13. The one or more computer-readable storage memories of claim 8 further comprising updating the index value effective to enable identification of a next random number for a next memory allocation request.

14. The one or more computer-readable storage memories of claim 8 further comprising maintaining a single index value for groups of multiple threads.

15. A computing device comprising:
one or more processors;
one or more computer-readable storage memories storing computer-readable instructions which, when executed by the one or more processors, implement a method comprising:
receiving, from an application thread, a request for memory to be allocated to the application thread, including an index value;
selecting a portion of a bitmap associated with a region including multiple blocks of the memory, the portion of the bitmap including a number of bits equal to a native word size of a device implementing the system, the portion including a location corresponding to a most recently freed block of the multiple blocks;
obtaining a random number from a list of previously generated random numbers, the obtaining based on the received index value;

determining, by rotating the portion of the bitmap a number of times based on the random number to generate a rotated portion of the bitmap, a starting location in the rotated portion of the bitmap;

scanning, beginning at the starting location, the rotated portion of the bitmap to identify a location in the rotated portion corresponding to an available block of the multiple blocks;

identifying the available block based on the identified location in the rotated portion; and returning, to the application thread, an indication of the available block.

16. The computing device of claim 15, wherein said indication comprises a memory address of a beginning of the available block.

17. The computing device of claim 15, wherein the index value can be initialized to different values.

18. The computing device of claim 15, wherein said obtaining is performed by obtaining the random number from a random number list at a location identified by the index value.

19. The computing device of claim 15, wherein said obtaining is performed by obtaining the random number from a random number list at a location identified by a value calculated from the index value.

20. The computing device of claim 15 further comprising updating the index value effective to enable identification of a next random number for a next memory allocation request.

* * * * *